R. STEIN.
MACHINE FOR AFFIXING AND CANCELING STAMPS.
APPLICATION FILED JULY 14, 1913.

1,167,442.

Patented Jan. 11, 1916.
4 SHEETS—SHEET 1.

Inventor:
Rudolf Stein
by B. Singer
Atty.

R. STEIN.
MACHINE FOR AFFIXING AND CANCELING STAMPS.
APPLICATION FILED JULY 14, 1913.
1,167,442.
Patented Jan. 11, 1916.
4 SHEETS—SHEET 2.
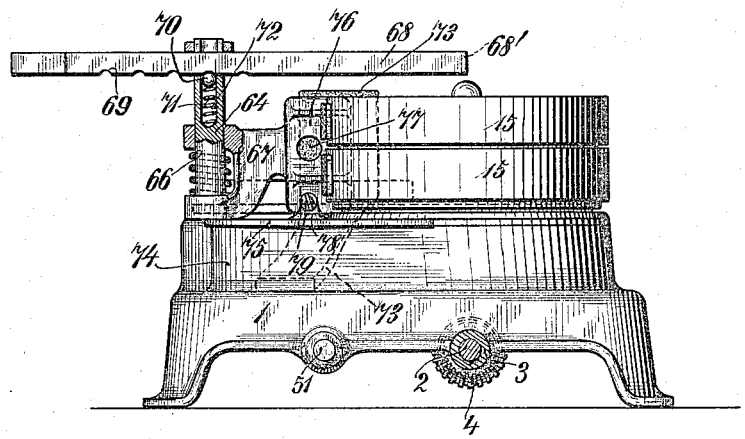
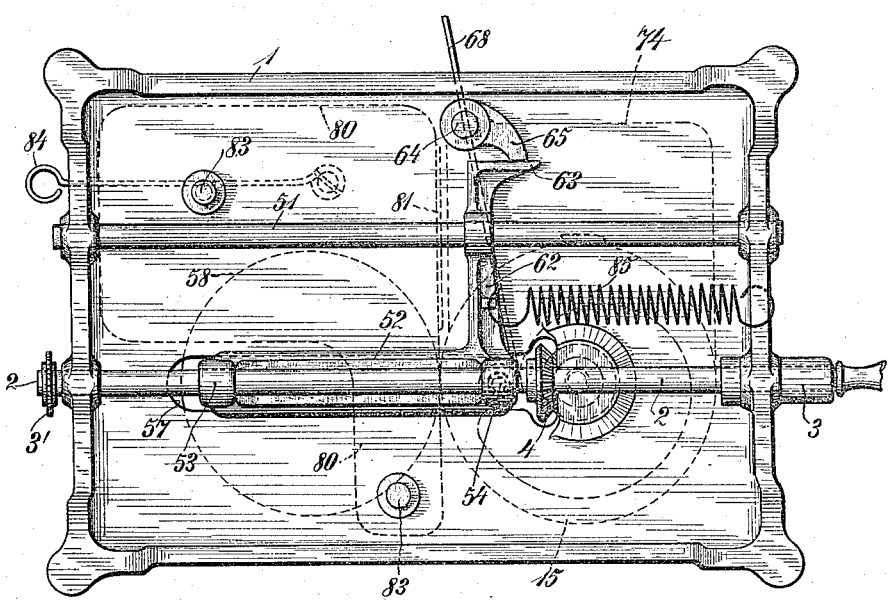

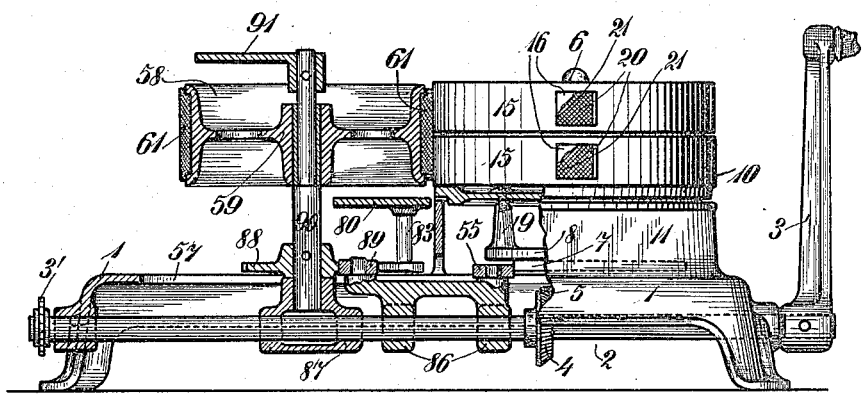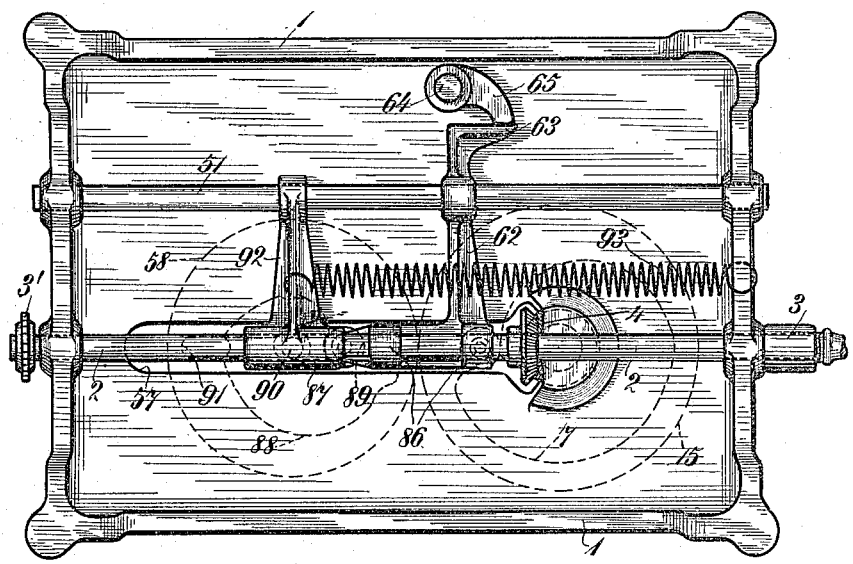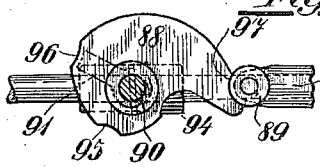

R. STEIN.
MACHINE FOR AFFIXING AND CANCELING STAMPS.
APPLICATION FILED JULY 14, 1913.

1,167,442.

Patented Jan. 11, 1916.
4 SHEETS—SHEET 4.

UNITED STATES PATENT OFFICE.

RUDOLF STEIN, OF FRANKFORT-ON-THE-MAIN, GERMANY.

MACHINE FOR AFFIXING AND CANCELING STAMPS.

1,167,442.  Specification of Letters Patent.  Patented Jan. 11, 1916.

Application filed July 14, 1913. Serial No. 778,973.

*To all whom it may concern:*

Be it known that I, RUDOLF STEIN, a subject of the German Emperor, and resident of Frankfort-on-the-Main, Germany, have invented a certain new and useful Improvement in Machines for Affixing and Canceling Stamps, of which the following is a specification.

This invention relates to a machine for automatically affixing stamps to postal matter or the like and for combining the same with a machine for automatically canceling the same if desired after they have been affixed to the postal matter. For this purpose the machine may be combined with the other one which is then preferably actuated from the main spindle of the stamping machine by a chain or the like to work in unison therewith.

More particularly it consists of the new arrangement and construction of the parts for affixing the stamps on a special base plate so that these parts of the machine may also be used separately from the canceling machine, as a machine only for affixing stamps, if the canceling mechanism is not required *e. g.* in private offices, or in combination with a canceling device. In addition to this the separated affixing device is adapted to deliver single stamps or a strip of any desired number of stamps without affixing them.

The invention also consists in some useful improvements in the component parts of the machine as hereinafter more particularly described with reference to the accompanying drawings. These drawings illustrate, by way of example, two embodiments of the affixing part or parts.

Figure 1:
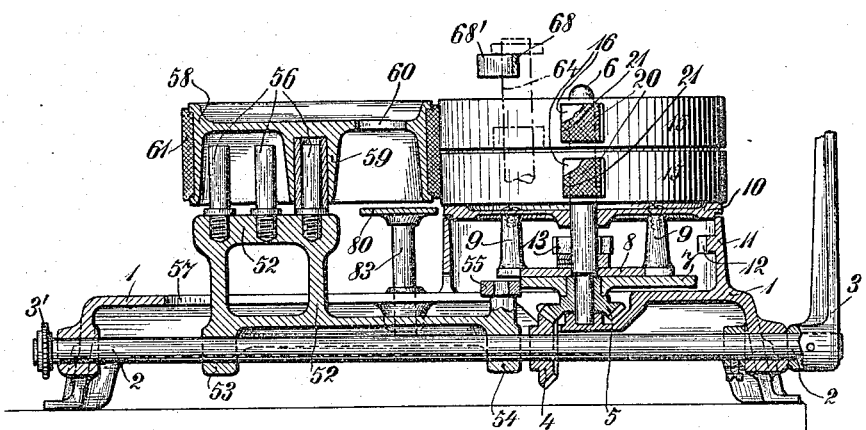
Figure 2:
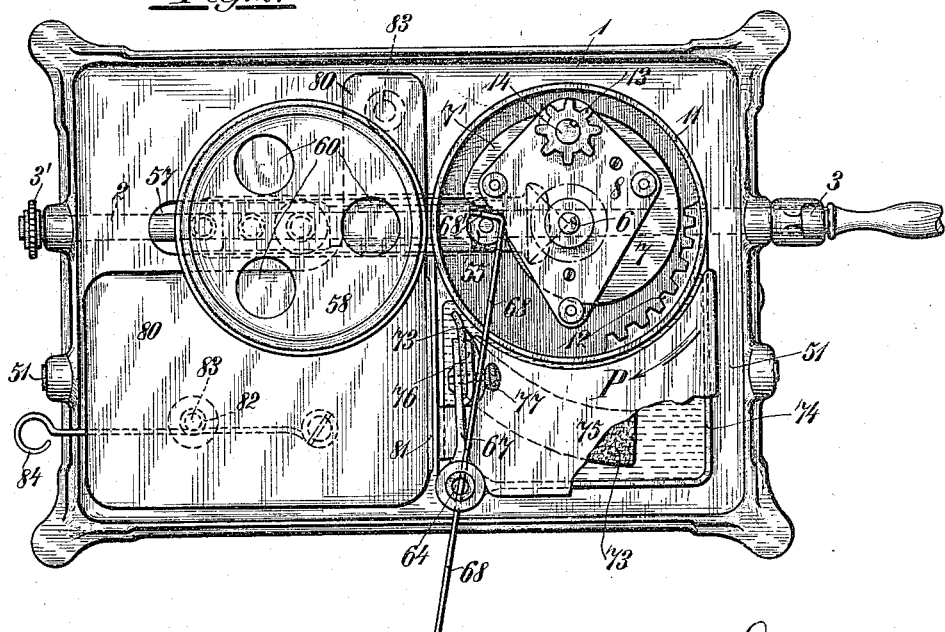
Figure 8:
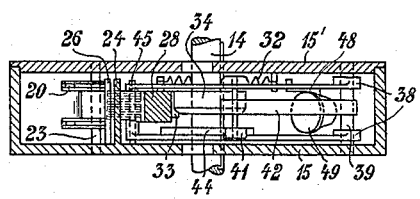
Figure 9:
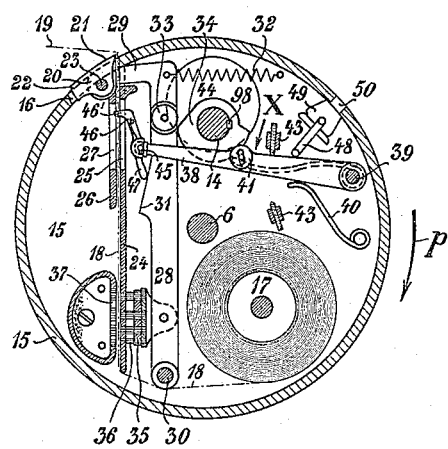

Figure 1 is a vertical section through the affixing machine along the main spindle showing the actuating means. Fig. 2 is a top plan view of the same, the stamp casings and the plate covering the actuating mechanism for the same having been removed. Fig. 3 is a bottom plan view of this machine, and Fig. 4 is a front view of the machine containing the moistener and the guide for the postal matter introduced. Fig. 5 is a side view of another form of the machine, partly in section, corresponding to Fig. 1. Fig. 6 a bottom plan view of the same corresponding to Fig. 3, and Fig. 7 is a top view of the cam and corresponding roller for varying the normal distances of the supporting roller from the stamp casing. Fig. 8 is a horizontal section through the rotary drum stamp casing. Fig. 9 is a vertical section through the same.

According to the embodiments shown in Figs. 1 to 4 the hollow base plate 1 contains the main spindle 2 with driving crank 3 at the one end and chain wheel 3' at the other for driving the stamp canceling device when combined therewith, and with a bevel wheel 4 meshing with a corresponding wheel 5, in the ratio 1:1. This bevel wheel 5 rotates about the vertical spindle 6 and is fitted with a cam disk 7 and a disk 8 supporting a circular disk 10 maintained at a certain distance from the disk 8 by means of props 9 corresponding to the height of which props there is arranged an annular rib 11 forming a casing with the disk 10. On the disk 8 and at a distance from the axis of rotation 6 thereof is rotatably mounted a vertical spindle 14 carrying a toothed wheel 13 meshing intermittently with a toothed segment 12 within the casing 11 once during each revolution of the disk 10 and of the crank 3; said spindle 14 is provided, along its upper part, with a slot within which fit coupling keys within each stamp casing 15 when mounted on the disk 10 and spindles 6 and 14. Said stamp casings 15 are formed as disk like cylindrical boxes of a diameter little larger than that of the disk 10, and each provided with a removable cover adapted to be locked by means of a key, a central opening for the spindle 6 and another opening for the spindle 14 connecting the casings with the disk 10. Within each casing there is rotatably mounted an interchangeable roll for the strip of stamps to be affixed, which strip is led to the opening 16 in the cylindrical wall of the casing 15.

At each aperture is pivoted a severing device 20 the forward edge of which (that is forward with regard to the direction of rotation of the casing as indicated by the arrow P in Fig. 2) beneath the end of the strip is pressed against an abutment (not shown in the drawings) by means of a spring (not shown).

Within each casing 15 are mounted the means for intermittently feeding the stamps if required by steps regulatable to suit stamps of different lengths, devices for retaining the strip, devices for counting the stamps delivered, and devices for marking the stamps, if desired, for instance by perforating them. The marking device may be combined with the retaining device so that it holds the strip when not engaged by the retaining device and thus prevents unauthorized removal of the strip from the casing.

Slidable on the main spindle 2 and the guiding rod 51 there is arranged a support 52 provided with eyelets 53 and 54 and a laterally extending arm 62 with abutment 63. At the left hand, on the part extending through a slot 57 over the base plate 1, said support 52 carries pins 56 for the supporting roller 58 of E-section as shown in Fig. 1, i. e. with a sufficient annular space between the hub 59 and the rim carrying a rubber band 61, so that the pins 56 allow the roller to be placed on and to rotate on each of them as required, (Figs. 1 and 2) and on the other end a roller 55 caused to coact with the cam disk 7 by the spring 85. This spring is attached to the arm 62 at the one end and to the front of the base plate 1 at the other and tends to pull the carrier 52 toward the right (Figs. 1, 2 and 3) i. e. toward the front side of the machine, so that the roller 58 may support the postal matter introduced into the machine when brought near the casings 15 said roller being mounted on the middle or on the innermost of the pins 56 with its hub 59, according to the thickness of the postal matter to be franked.

Rotatably mounted in the base plate 1 is a vertical spindle 64 provided with an arm 65, secured at its end below the base plate and coacting with the abutment 63 of the arm 62, and with an angle 68, 68′ slidably arranged in the upper part above the casings 15 when set. This angle may be moved endwise in a transverse slot in the pin 64, and maintained in certain positions by means of a ball 70 pressed against notches 69 on the lower side of the rod 68 by a spring 71 within the hole 72 in the pin 64. Said pin 64 serves at the same time as the pivot of the arm 67 which is rotatable about it and carries a moistening felt 73 kept in position on the arm 67 by means of a plate 76 the pressure of which against the felt and the arm 67 is regulated by means of the screw 77 in order to regulate the desired degree of moisture of the felt which lifts water from the receptacle 74 (with cover 75) on the base plate 1. The hub of the arm 67 is bifurcated to receive a spring 66 encircling the pin 64 and fixed to said pin at one end while the other end presses against the arm 67, which rests against an abutment 78 with regulating screw 79 on the cover 75.

Beneath the supporting roller 58 the base plate 1 carries, on two rods 83, a table 80 or the like supporting the postal matter introduced and fitted with a lateral rabbet 81 for the letter or the like before being seized by the casings 15 and the supporting roller 58 the cylindrical surface of which is fitted with an annular rubber band 61 pressing against the postal matter. The height of the plate 80 may be varied to change the position of the stamp or the like when affixed to the postal matter, as the rods 83, fixed to the plate 80, are slidably guided in the base 1 and a spring catch 84 may enter corresponding notches in one of the rods 83 thus fixing the position of the plate 80.

The *modus operandi* of the new machine is as follows:—After the rolls of strips of stamps required have been inserted in the casings 15 and the strips pulled to the edges 21 of cutters 20 of the casings which are then locked and mounted on the pins 6 and 14 on the disk 10, the receptacle 74 is filled with water, and the pressure of the screw 77 regulated so as to control the amount of water lifted by the felt 73, until the desired degree of moisture has been attained, the affixing machine or the affixing part of the complete machine is ready for use. The letters or other postal matter to be treated are introduced one by one, standing on the table 80 and resting against the pillar 64, and the flange 81 of the table till they pass the line between the centers of the casings 15 (spindle 6) and of the roller 58 (Figs. 2 and 3) and reach the abutment 68′ which is kept in a position in which it projects into the path of the postal matter parallel to the spindle 2, by the lever 68 and the pin 64, under the action of the spring 66. The position at which the stamps are to be affixed on the postal matter may be varied by raising or lowering the plate 80 keeping its handle 82, in one direction e. g. laterally, and by pushing forward or drawing back the arm 68 with projecting abutment 68′ in the other direction e. g. with regard to the height of the letters or the like. By rotating the crank 3 with spindle 2, wheel 5, cam disk 7 and disk 10 the casings 15 are rotated in the direction of the arrow P (Fig. 2). The pinion 13 on the spindle 14 is caused to pass the toothed segment 12 which turns said wheel and the pin 14 through one complete revolution, advancing a new stamp over the separating edge 21 of the cutter 20 and keeping the strip also in this advanced position so that it is impossible to advance the strip more than by the length of one stamp at each revolution of the casings 15 in position on the spindles 6 and 14. On rotating the crank 3, spindle 2 and casings 15 the cam 7 yields to the roller 55 so that the supporting roller may be moved against the letter pressing it against the casings 15 at the moment when the cutter 20 with its edge 21 reaches it so that the letter is advanced, and the stamp 19 affixed and separated from the strip as soon as the pivot of the cutter 20 has passed over the axis of the main spindle 2 and the cutter has been moved about its pivot by the supporting roller 58 pressing against the rear part of the cutter. This roller 58 presses the letter or the like against the casings 15 as long as is required for advancing it as far as to be thrown into the hopper or the like or to be seized by the traveling mechanism of the canceling machine or part, or to fall out of the machine when only the affixing of the stamps is to be effected. Then the roller 58 is moved back toward the left, away from the casings, by the cam 7 by means of the roller 55 and the carrier 52. The crank has returned into initial position and the machine is ready to treat another letter or the like. Should the postal matter be too thick to pass between the rollers 15 and 58, when the letter is set on the pin 56 next to the roller 55, the roller 58 is set on the second pin 56, and in order to prevent operation of the cutter 20, i. e. to advance several connected stamps from the strip, the roller 58 may be set on the outermost peg 56, in which position it is not moved quite against the letter or the like when inserted, and should unmoistened stamps be desired (e. g. for inclosure with a letter within the envelop), the carrier 67 of the moistener 73 may be turned a little in a counter clockwise direction so for as to remain out of contact with the stamps projecting from the casing when moved around with said casings 15. Before advancing the last stamp required in this way, the supporting roller 58 may again be mounted on the innermost pin 56 to be brought into contact with the casings 15 on the next revolution advancing the last stamp required so that this is separated from the strip within the casing and thrown out together with the adhering stamps as if it were to be affixed to postal matter on the last revolution of the crank. Then the moistener is released and the machine is ready again for ordinary use as described.

The machine shown in Figs. 5, 6 and 7 is the same as that shown in the other figures with the exception of an alteration of the parts required for changing the position of the supporting roller relatively to the roller 55 coacting with the cam disk 7. In this case the roller 58 is rotatably mounted on a pin 90 to which is rigidly attached above said roller a lever or crank 91. Said pin 90 is rotatably supported by the carrier 87 slidable on the spindle 2 and, by means of a lateral arm 92, on the pin 51, and carries a cam disk 88 coacting with a roller 89, rotatably mounted on the carrier 86, slidably arranged on the spindle 2 and provided with a lateral arm 62 just as described with the other form of the machine, said carrier 86 being fitted with another roller 55 coacting with the cam disk 7, against which it is pressed by means of the spring 93 attached to the arm 92 and corresponding to the spring 85 of the form described first. The cam disk 88 is provided with recesses 94, 95, 96 and 97 at different distances from the pin 90, so that by turning said pin by the handle 91 the distance of the roller 55 from the roller 58 may be varied at will, corresponding to the mounting of the roller 58 on the different pegs 56 on the carrier 52 of the form first described. The operation of the second form is easily understood from the above having regard to the accompanying drawings.

Having described my invention I declare that what I claim and desire to secure by Letters Patent of the United States is:—

1. A machine for affixing and canceling postage stamps and the like drawn in strips from rolls to postal matter comprising in combination rotary drum stamp casings each mounted on a spindle, a cam disk mounted on said spindle and adapted to rotate with said casings, a postal matter supporting roller located in proximity to said casings, a spring adapted to press said roller against said casings and an abutting angle piece disposed in the path of the postal matter, said abutting angle piece being adjustable as and for the purpose set forth.

2. A machine for affixing and canceling postage stamps and the like drawn in strips from rolls to postal matter comprising in combination rotary drum stamp casings each mounted on a spindle, a cam disk mounted on said spindle and adapted to rotate with said casings, a postal matter supporting roller located in proximity to said casings, a spring adapted to press said roller against said casings, an abutting angle piece disposed in the path of the postal matter, said abutting angle piece being adjustable, means for moving said angle piece and a spring holding said abutting angle in position and adapted to coöperate with said means.

3. A machine for affixing and canceling postage stamps and the like drawn in strips from rolls to postal matter comprising in combination rotary drum casings each mounted on a spindle, a cam disk mounted on said spindle and adapted to rotate with said casings, a postal matter supporting roller located in proximity to said casings, a spring adapted to press said roller against said casings, an abutting angle piece disposed in the path of the postal matter, said abutting angle piece being adjustable, means for moving said angle piece, a spring holding said abutting angle in position and adapted to coöperate with said means and a table located in proximity to said roller, said table adjustable in height as and for the purpose set forth.

4. A machine for affixing and canceling postage stamps and the like drawn in strips from rolls to postal matter comprising in combination a rotary drum stamp casing mounted on a spindle, a postal matter supporting roller located in proximity to said casing and a spring adapted to press the said roller against said casing and means for supporting said roller at different distances from said casing.

5. A machine for affixing and canceling postage stamps and the like drawn in strips from rolls to postal matter comprising in combination a rotary drum stamp casing mounted on a spindle, a postal matter supporting roller located in proximity to said casing, a spring adapted to press the said roller against said casing, a carrier for said supporting roller and means for positioning said roller on said carrier at different distances from said casing.

6. A machine for affixing and canceling postage stamps and the like drawn in strips from rolls to postal matter comprising in combination a rotary drum stamp casing mounted on a spindle, a cam disk mounted on said spindle and adapted to rotate with said casing, a postal matter supporting roller located in proximity to said casing, a spring adapted to press said roller against said casing, a carrier for said supporting roller and pins mounted on said carrier as and for the purpose set forth.

7. A machine for affixing and canceling postage stamps and the like drawn in strips from rolls to postal matter comprising in combination rotary drum stamp casings each mounted on a spindle, a cam disk mounted on said spindle and adapted to rotate with said casings, a postal matter supporting roller located in proximity to said casings, a spring adapted to press said roller against said casings, a moistener, and a carrier for said moistener, an abutting angle piece disposed in the path of the postal matter, said abutting angle piece being adjustable, means for moving said angle piece, a spring holding said abutting angle in position and adapted to coöperate with said means, said spring pressing the carrier for said moistener against the stamps.

8. A machine for affixing and canceling postage stamps and the like drawn in strips from rolls within stamp casings to postal matter comprising in combination with rotary drum stamp casings mounted on a spindle and actuating mechanism for said casings, a postal matter supporting roller located in proximity to said casings and a spring adapted to press the said roller against said casings, and means for coupling said casings with said actuating mechanism.

9. A machine for affixing and canceling postage stamps and the like drawn in strips from rolls within stamp casings to postal matter comprising in combination with rotary drum stamp casings mounted on a spindle and actuating mechanism for said casings, a postal matter supporting roller located in proximity to said casings and a spring adapted to press the said roller against said casings and means for coupling said casings with said actuating mechanism, a spindle eccentric to the spindle for said casings with means for intermittently rotating said eccentric spindle, said spindle adapted to actuate the advancing and other devices of the strips of stamps.

10. A machine for affixing and canceling postage stamps and the like drawn in strips from rolls to postal matter, comprising in combination with a bed plate a spindle mounted to rotate in said bed plate, a rotary drum stamp casing mounted on said spindle, a cam disk mounted on said spindle and adapted to rotate with said casing, a postal matter supporting roller located in proximity to said casing, a carrier for said supporting roller, an actuating spindle located beneath the base plate of the machine and arranged to support said carrier, a second guide and supporting rod parallel to said actuating spindle, means for supporting the postal matter being treated, said means being regulatable, a moistener for the stamps, an abutment for the postal matter and means for moving the abutment into inoperative position.

In testimony whereof I have signed my name to this specification in the presence of two subscribing witnesses.

RUDOLF STEIN.

Witnesses:
 JEAN GRUND,
 CARL GRUND.

Copies of this patent may be obtained for five cents each, by addressing the "Commissioner of Patents, Washington, D. C."